United States Patent [19]
Irie

[11] Patent Number: 5,257,022
[45] Date of Patent: Oct. 26, 1993

[54] METHOD AND APPARATUS FOR FOLLOWING A VEHICLE

[75] Inventor: Tatsuji Irie, Himeji, Japan
[73] Assignee: Mitsubishi Denki K.K., Tokyo, Japan
[21] Appl. No.: 670,559
[22] Filed: Mar. 18, 1991
[30] Foreign Application Priority Data
Mar. 20, 1990 [JP] Japan ................................. 2-71383
[51] Int. Cl.⁵ ............................................ G08G 1/123
[52] U.S. Cl. .................................... 340/988; 318/587; 340/435; 340/903; 364/424.02
[58] Field of Search ............... 340/988, 903, 435, 436, 340/942, 721; 318/587; 364/424.01, 424.02, 460, 461, 518, 449; 180/167; 358/103

[56] References Cited
U.S. PATENT DOCUMENTS

| | | | |
|---|---|---|---|
| 4,926,346 | 5/1990 | Yokoyama | 364/424.02 |
| 4,987,357 | 1/1991 | Masaki | 340/988 |
| 5,039,217 | 8/1991 | Maekawa et al. | 340/942 |

FOREIGN PATENT DOCUMENTS

116386 9/1981 Japan .
196412 11/1983 Japan .

*Primary Examiner*—Jin F. Ng
*Assistant Examiner*—Brent A. Swarthout
*Attorney, Agent, or Firm*—Sughrue, Mion, Zinn, Macpeak & Seas

[57] ABSTRACT

A method and an apparatus for following a vehicle are disclosed by which the distance from a vehicle to a preceding target vehicle running ahead thereof can be exactly measured and, based on the thus measured distance, an appropriate vehicle following window can be automatically set with respect to a target image of the preceding vehicle at the start of vehicle following. Images of objects including the preceding vehicle are taken from two different points. The distance to the preceding vehicle is measured based on the images thus taken from the two points. On the basis of the measured distance, the size of an image-following window to be set within an image area displayed on a screen of a display is determined for following the preceding vehicle. The image of the preceding vehicle is found among various images of objects in the image area on the screen, and the position of the window on the screen is properly set and then temporarily stored in a memory. From various images of objects presently taken from the one of the two points, a new image is found which most resembles the image of the preceding vehicle in the last window stored in the memory. Based on the new image, a new window containing it is set on the screen. The position of the new window is adjusted to a location at which the best symmetry of the image within the new window is obtained while shifting the window stepwise. Then, the above steps are repeated.

7 Claims, 3 Drawing Sheets

IMAGE IN MEMORY 5 HAVING A FIRST SET WINDOW

IMAGE IN MEMORY 6

IMAGE IN MEMORY 5 HAVING A RESET WINDOW

WINDOW SETTING

WINDOW ADJUSTMENT

METHOD AND APPARATUS FOR FOLLOWING A VEHICLE

BACKGROUND OF THE INVENTION

The present invention relates to a method and an apparatus for following a vehicle in which a vehicle is able to follow a preceding vehicle running ahead in an automatic fashion while maintaining an appropriate distance therefrom.

Some typical examples of a vehicle distance measuring apparatus usable for following a vehicle are disclosed in Japanese Patent Publication Nos. 63-38085 and 63-46363. The apparatuses disclosed therein commonly have a pair of first and second parallel optical systems having two convex lenses 101, 102 disposed in a horizontally aligned relation at a prescribed distance L away from each other, as shown in FIG. 4. A pair of separate image sensors 103, 104 are horizontally disposed at the focal points of the lenses 101, 102 spaced a focal distance f from the locations of corresponding lenses 101, 102, respectively, for generating respective image signals to a common signal processor 120. The signal processor 120 successively shifts the image signals from the image sensors 103, 104 and electrically superposes them one over the other, so that the distance R from the lenses 101, 102 to an object 121 is calculated based on the principle of triangulation using the following formula:

$$R = (f \times L)/d \quad (1)$$

where d is a shift distance by which the image signals are moved to obtain the best match.

On the other hand, a typical method for following a preceding vehicle using an image sensor or the like is disclosed in Japanese Patent Publication No. 60-33352. In this method, for the purpose of following a target on a display screen, an operator has to set a following gate or window on the display screen which encloses the target to be followed, while looking at the screen.

Although it has been considered to combine the vehicle distance measuring apparatuses as described above, which operate to successively detect the distance from a vehicle to a preceding vehicle using an optical distance measuring device equipped with an image sensor, with the above-described vehicle following method, it is almost practically impossible for the driver to form a window or following gate similar in configuration to the image of the preceding vehicle using a joy stick, a track ball, a mouse and the like while driving the vehicle, as described in Japanese Patent Publication No. 60-33352, particularly from a safety point of view.

SUMMARY OF THE INVENTION

Accordingly, the present invention is intended to overcome the above-described problems which would be encountered from using the known vehicle distance measuring apparatuses in combination with the known vehicle following method.

An object of the invention is to provide a novel and improved method and apparatus for following a vehicle by which the distance from a vehicle to a preceding target vehicle running ahead thereof can be exactly measured and, based on the thus measured distance, an appropriate vehicle following window can be automatically set with respect to a target picture image of the preceding vehicle at the start of vehicle following.

In order to achieve the above objects, according to one aspect of the present invention, there is provided a method for following a vehicle comprising the following steps of:

successively picking up images of objects including a preceding vehicle ahead of a vehicle from two different points;

measuring the distance to the preceding vehicle based on the images thus taken from the two points;

determining, based on the measured distance, the size of an image-following window to be set within the images displayed on a screen of a display for following the preceding vehicle;

finding the image of the preceding vehicle among various images of objects displayed on the screen and setting the position of the window on the screen so as to contain therein the image of the preceding vehicle;

temporarily storing the thus set window in a memory;

detecting, from various images of objects presently picked up from the one of the two points, a new image of an object which most resembles the image of the preceding vehicle in the last window stored in the memory, and setting, based on the new image, a new window containing it on the screen;

adjusting the position of the new window to a location at which the best symmetry of the image within the new window is obtained while shifting the window stepwise; and repeating all the above steps.

According to another aspect of the present invention, there is provided an apparatus for following a vehicle comprising:

image sensing means for successively picking up images of objects including a preceding vehicle ahead of a vehicle from two different points;

distance measuring means for measuring the distance to the preceding vehicle based on the images thus taken from the two points;

window-size determining means for determining, based on the measured distance, the size of an image-following window on a screen of a display for following the preceding vehicle;

window-position setting means for finding the image of the preceding vehicle among various images of objects on the screen, and for setting the position of the window on the screen so as to contain therein the image of the preceding vehicle;

means for temporarily storing the thus set window in a memory;

comparison means for detecting, from various images presently picked up from the one of the two points, a new image of an object which most resembles the image of the preceding vehicle in the last window stored in the memory, and setting, based on the new image, a new window containing it on the screen; and window-position adjusting means for adjusting the position of the new window to a location at which the best symmetry of the image within the new window is obtained while shifting the window stepwise.

Preferably, the window-position setting means finds an image which is the most symmetric with respect to its vertical center line.

Preferably, the distance measuring means comprises:

comparison means for comparing the images of the preceding vehicle taken at the different points with each other so as to obtain a shift distance by which one of the images is moved towards the other to be fully superposed thereon; and calculating means for calculating the distance to the preceding vehicle based on the shift distance thus obtained.

The above and other objects, features and advantages of the present invention will become more readily apparent from the following detailed description of a preferred embodiment thereof taken in conjunction with the accompanying drawings.

DESCRIPTION OF A PREFERRED EMBODIMENT

An embodiment of the present invention will now be described in detail with reference to the accompanying drawings.

Figure 1:
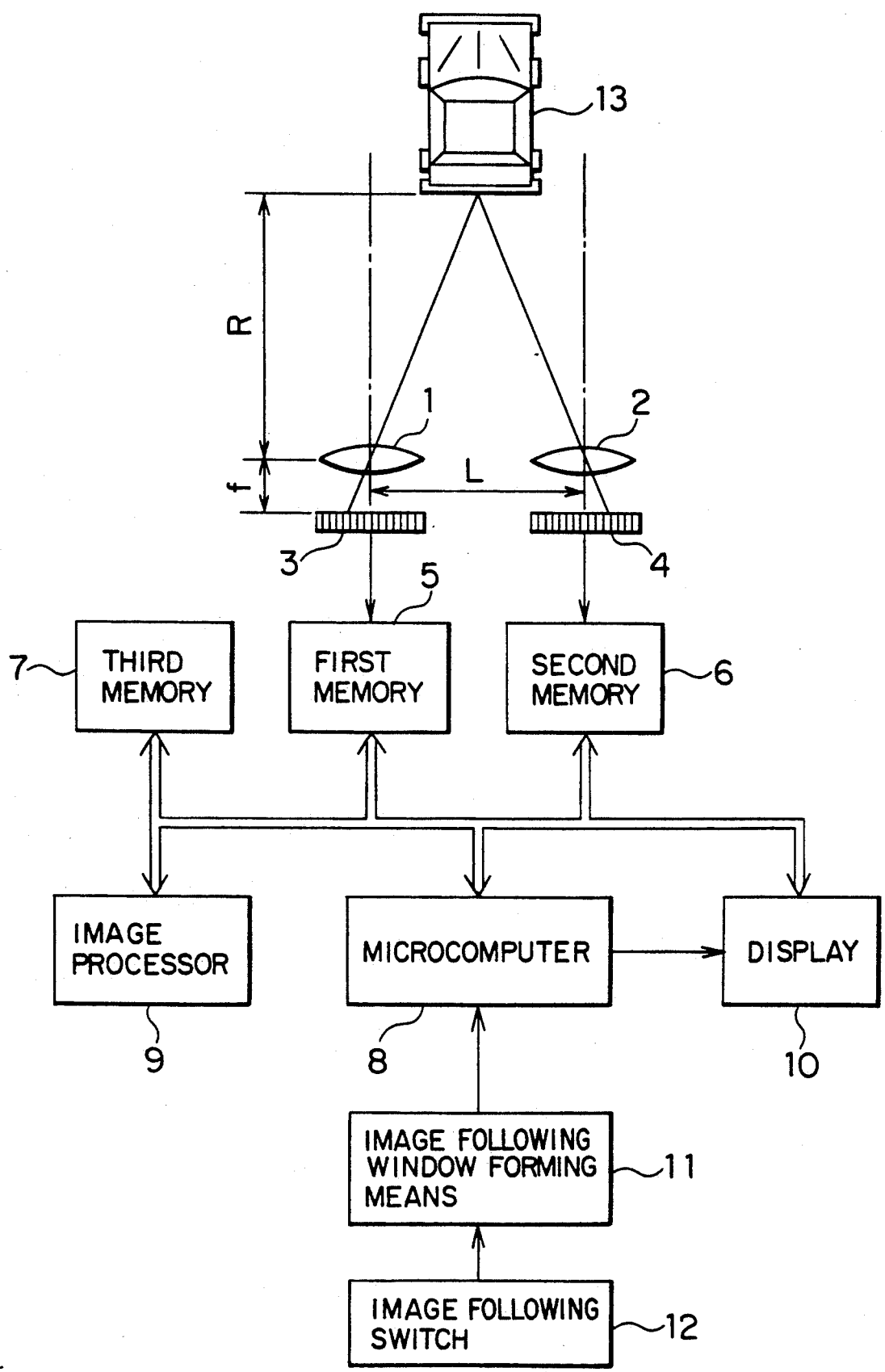
FIG. 1 is a block diagram of a vehicle following apparatus constructed in accordance with the present invention.

FIG. 1 illustrates the schematic construction of an apparatus for following a preceding vehicle in accordance with the present invention. The apparatus illustrated includes a pair of first and second parallel optical systems having two convex lenses 1, 2 disposed in a horizontally aligned relation at a prescribed distance L away from each other, and a pair of separate first and second (or left-hand and right-hand) image sensors 3, 4 horizontally disposed at focal points of the lenses 1, 2 at a distance f from the locations of corresponding lenses 1, 2, respectively, for generating respective image signals each in the form of an analog signal representative of a two-dimensional picture image to a pair of corresponding first and second memories 5, 6. A third memory 7 stores images from the first memory 5 which are processed by a microcomputer 8 and transferred thereto via a bus. An image processor 9 is connected to the first through third memories 5 through 7, the microcomputer 8 and a display 10 for performing image processing of the data stored in the memories 5 through 7 under the control of the microcomputer 8. The display 10 is connected to the image processor 9 and the microcomputer 8 for displaying an image of a preceding vehicle 13 formed by the image processor 9 under the control of the microcomputer 8. The apparatus further includes an image-following window forming means 11 connected to the microcomputer 8, and an image-following switch 12 which is operated by the driver of the vehicle for turning on and off the image-following window forming means 11.

The operation of the above-described apparatus will now be described with particular reference to FIGS. 2(a) through (2c) and FIGS. 3(a) and 3(b). First, an image of a preceding vehicle 13 is taken by the image sensors 3, 4 and input to the memories 5, 6. The image of the preceding vehicle 13 thus input is then transmitted from the memories 5, 6, to the display 10 where it is displayed on a screen of a CRT.

When the driver turns on the image-following switch 12, the image-following window forming means 11 is operated to first set an image-following window of a predetermined size or dimensions so that images of objects inside the window are read out by the microcomputer 8 and displayed on the screen of the display 10. Simultaneous with this read out, the microcomputer 10 allocates corresponding addresses of the images of objects in the memories 5, 6.

The procedures for following a preceding vehicle and measuring the distance thereto while setting an image-following window at time $t_o$ will be described below in detail with particular reference to FIGS. 2(a) through 2(c). In these figures, the vertical direction and the horizontal direction of the preceding vehicle are designated by reference characters i, j, respectively.

Figure 2A:
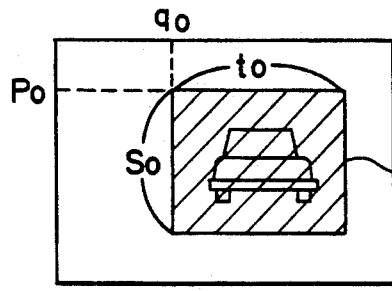
FIG. 2(a) is an explanatory view showing a reference image of a preceding vehicle inside a vehicle following window in a memory 5 of FIG. 1 which is first formed at the start of vehicle following by the apparatus of FIG. 1.
Figure 3A:
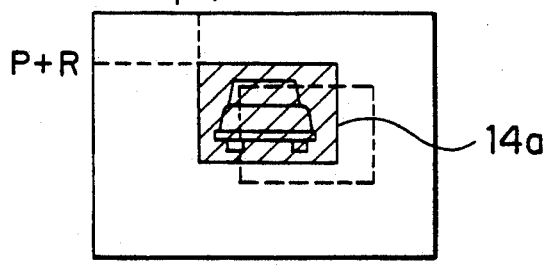
FIG. 3(a) is an explanatory view showing a vehicle following window successively set during vehicle following by the apparatus of FIG. 1.
Figure 3B:
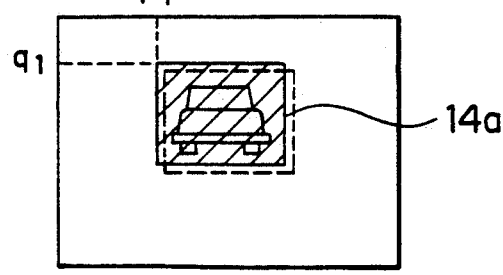
FIG. 3(b) is an explanatory view showing the adjustment of the window during vehicle following by the apparatus of FIG. 1.
Figure 4:
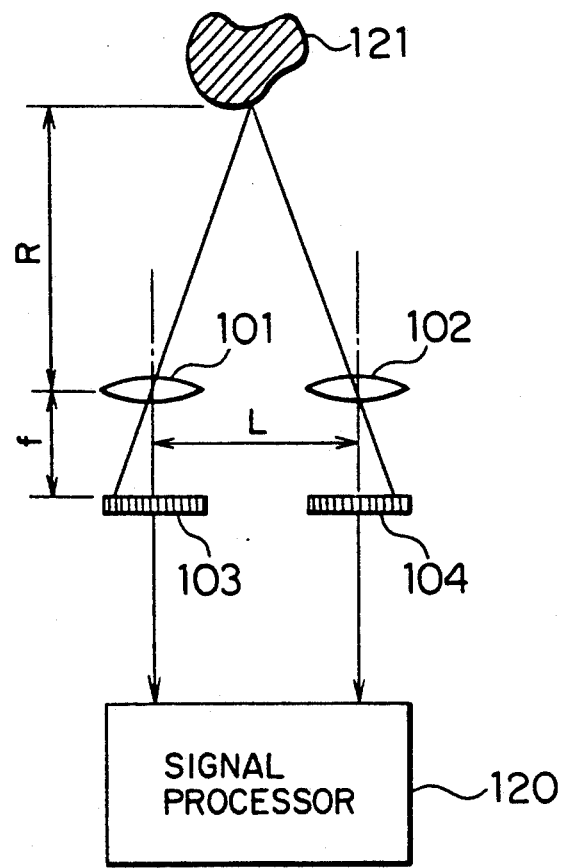
FIGS. 4 is a schematic block diagram of the general construction of a known distance measuring apparatus.

When the image-following switch 12 is switched on by the driver, the image-following window forming means 11 sets a window 14, as illustrated in FIG. 2(a), which has a rectangular area having a vertical length of $S_o$ and a horizontal length of $t_o$ (which is indicated by hatching and hereinafter referred to as dimensions of $s_o \times t_o$) relative to a point $(p_o, q_o)$ which is a reference point or an origin of coordinates. Then, the microcomputer 8 allocates corresponding addresses of the window 14 in the memory 5.

Figure 2B:
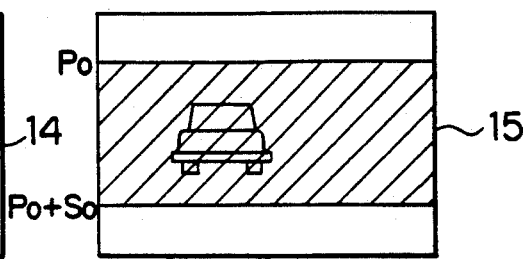
FIG. 2(b) is an explanatory view showing an image area in a memory 6 of FIG. 1 to be compared with the reference image of FIG. 2(a)
Figure 2C:
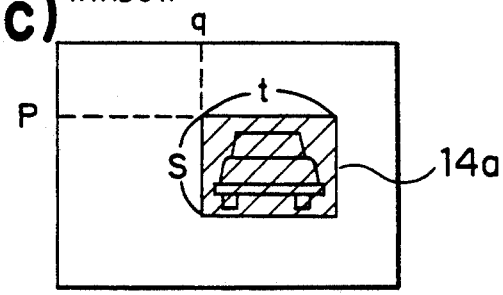
FIG. 2(c) is an explanatory view showing a newly set window in the memory 5 based on the distance to the preceding vehicle as measured just after the start of vehicle following.

Subsequently, as shown in FIG. 2(b), the microcomputer 8 successively takes out from an area 15 in the memory 6, which extends from point $(p_o)$ to point $(p_o+s_o)$, an image area corresponding to the dimensions of $s_o \times t_o$ of the window 14 for comparison with the window 14 in the memory 5. That is, assuming that left-hand and right-hand image signals from the first and second memories 5, 6 are represented by Si, j, and Ti, j, respectively, a total sum $A_K$ of the absolute values of the differences between the left-hand and right-hand image signals $(S_{i,j} - T_{i,j})$ is calculated by the image processor 9 as follows:

$$A_K = \sum_{i=p_o}^{p_o+s_o} \sum_{j=q_o}^{q_o+t_o} |S_{i,j} - T_{i,(j+k)}| \quad (k = 0, 1, 2, \ldots N) \quad (2)$$

As a result of this calculation, the amount of shift d of formula (1) becomes equal to the difference between k and $p_o$ in which k takes a value which minimizes the absolute value $A_K$. Using the amount of shift d thus calculated, the microcomputer 8 calculates the distance R to the preceding vehicle 13.

Thereafter, based on the distance R, the microcomputer 8 determines the size or dimensions of the window 14. Let us suppose that the focal distance f of the first and second lenses 1, 2 is constant, and that a window 14 of the dimensions $s_o \times t_o$ is set for an intervehicle distance (i.e., the distance to the preceding vehicle 13) $R_o$. In this case, if a new intervehicle distance presently measured is R, the size of the window 14 is then reset to the dimensions of $(s_o \times R_o/R) \times (t_o \times R_o/R)$. This calculation is carried out by the microcomputer 8.

Next, in the case of measuring the distance to an automotive vehicle, since such vehicles are generally symmetric with respect to their longitudinal center lines when looked at from the back, an object which is most symmetrical with respect to its longitudinal center line among other objects imaged by the image sensors 3, 4 can be assumed to be the image of a preceding vehicle. Thus, the most symmetrical image is searched for and found from among many images stored in the memory 5 for determining a proper setting of the window location. That is, assuming that the size of the window as determined in the above manner is $s \times t$, the reference point or the origin of coordinates $B_{kl}$ for the window is given by the following formula:

$$B_{kl} = \sum_{m=0}^{s} \sum_{n=0}^{\frac{t}{2}} |S_{(m+k),(r-n)} - S_{(m+k),(r+n+1)}| \quad (3)$$

where $r = 1 + t/2$. By successively changing k and l in formula (3) above, the image-processor 9 calculates $B_{kl}$. As a result of the calculations, the values of k and l which make $B_{kl}$ a minimum provide the most symmetrical image. Thus, assuming that the values k and l providing a minimum of $B_{kl}$ are p and q, respectively, as shown in FIG. 2(c), a new window 14a is set in the memory 5 with point (p, q) being a reference point.

Subsequently, image signals are transmitted from the memory 5 to the memory 7, and then after the lapse of a certain prescribed time from the signal transmission (i.e., at time $t_1$ shortly after time $t_o$), image signals are taken from the image sensors 1, 2 into the memories 5, 6. The images of objects thus taken in the memory 5 are compared with the image of the preceding vehicle 13 inside the window 14a which was set at time $t_o$ and stored in the memory 7 so as to find the most similar one. In this manner, the position of the preceding vehicle within the images in the memory 5 at time $t_1$ can be determined. That is, assuming that new image signals in the memory 5 at time $t_1$ are $S_{i,j}$, the previously set window 14a has a reference point (p, q) and the size of $s \times t$, so new reference point $C_{kl}$ is obtained by the following formula:

$$C_{kl} = \sum_{i=p}^{p+s} \sum_{j=q}^{q+t} |S_{i,j} - S'_{(i+k),(j+l)}| \quad (4)$$

In formula (4) above, the image processor 9 calculates $C_{kl}$ by successively changing k, l. The values for k, l which minimize $C_{kl}$ indicate amounts of window shift. Thus, at time $t_1$, a window 14a is provisionally set which has a reference point (p+k), (q+l) and the size of $s \times t$, as illustrated in FIG. 3(a).

Further, the window 14a is successively moved little by little about this originally set position in the vertical and horizontal directions so that the symmetry of the image therein with respect to its longitudinal (e.g., vertical in the illustrated example) center line at each of thus moved window positions is determined in the above-described manner based on formula (3) above so as to find a most appropriate reference point ($p_1$, $q_1$). In this way, the setting of the window 14a is properly adjusted with point ($p_1$, $q_1$) being made a new reference point. As a result, accurate following of the preceding vehicle 13 can be performed.

After the new window 14a has been set in this manner, the distance R to the preceding vehicle 13 is again measured using the distance measuring method as expressed by formula (2) above.

Although in the above embodiment, a pair of optical systems are disposed in a horizontally symmetric relation, this is not intended to limit the optical systems to such disposition. In fact, they can instead be disposed in a vertically symmetric relation, in an obliquely symmetric relation, or otherwise as far as they can provide substantially the same results as referred to above.

Moreover, although in the above embodiment, a pair of separate image sensors 3, 4 are employed as shown in FIG. 1, they may be a single image sensor having a pair of image sensing ranges or a single image sensing range divided into two.

As described in the foregoing, according to the present invention, a window is set within images of objects picked up by an image sensing means, and images of objects inside the window at a certain point of time are successively compared with those at a later time so as to find mutually resembling picture images. Then, the symmetry of each image thus found is searched so that one having the best symmetry is determined to be a preceding vehicle. Based on this determination, a new window is set for following the preceding vehicle. As a result, it is possible to accurately follow the preceding vehicle in an automatic fashion while measuring the distance thereto.

In addition, at the start of vehicle following, the distance to a preceding vehicle, that is placed in advance in front of the image sensing means and hence at a location near the center of a following window, is provisionally measured, and an image-following window is first set which has a size determined on the basis of the provisional distance thus measured in order to subsequently find a most symmetrical image from among other various images of objects, which is considered to correspond to the preceding vehicle. Thus, if the image sensing means is mounted in the front grill portion of the driver's vehicle, the driver need only steer his vehicle so that the back of the preceding vehicle is located directly in front of the grill. In this manner, the preceding vehicle is automatically found, so the driver only has to manipulate an image-following switch for setting a proper vehicle-following window. This substantially reduces the possibility that the driver's setting of a proper following window could impair safe driving.

What is claimed is:

1. A method for following a vehicle comprising the steps of:
   successively sensing and generating images of objects including a preceding vehicle ahead of a trailing vehicle from each of two different points;
   measuring a distance to the preceding vehicle based on the images generated from the two points;
   determining, based on the measured distance, a size of an image-following window to be set within a screen of a display used for following the preceding vehicle;
   finding the image of the preceding vehicle among various images of objects displayed on the screen and setting a position of the window on the screen so as to contain therein the image of the preceding vehicle;
   temporarily storing the thus set window in a memory;
   detecting, from various images of objects generated from one of the two points, a new image of an object which most resembles the image of the preceding vehicle in a previous window stored in the memory, and setting, based on the new image, a new window containing the new image on the screen;

adjusting the position of the new window to a location at which the best symmetry of the image within the new window is obtained while shifting the window stepwise; and repeating all the above steps.

2. A method for following a vehicle according to claim 1, wherein said step of finding the image of the vehicle comprises finding an image of an object which is most symmetrical with respect to its vertical center line.

3. A method for following a vehicle according to claim 1, wherein said step of measuring the distance to the vehicle comprises the steps of:

comparing the two images of the vehicle taken at the two different points with each other so as to obtain a shift distance by which one of the images is moved towards the other to be fully superposed thereon; and calculating the distance to the vehicle based on the shift distance thus obtained.

4. An apparatus for following a vehicle comprising:

image sensing means for successively sensing and generating images of objects including a preceding vehicle ahead of a trailing vehicle from each of two different points;

distance measuring means for measuring the distance to the preceding vehicle based on the images generated from the two points;

window-size determining means for determining, based on the measured distance, the size of an image-following window on a screen of a display for following the preceding vehicle;

window-position setting means for finding the image of the preceding vehicle among various images of objects on the screen, and for setting the position of the window on the screen so as to contain therein the image of the preceding vehicle;

means for temporarily storing the thus set window in a memory;

comparison means for detecting, from various images presently generated from the one of the two points, a new image of an object which most resembles the image of the preceding vehicle in a window previously stored in the memory, and setting, based on the new image, a new window containing it on the screen; and window-position adjusting means for adjusting the position of the new window to a location at which the best symmetry of the image within the new window is obtained while shifting the window stepwise.

5. An apparatus for following a vehicle according to claim 4, wherein said window-position setting means finds an image which is the most symmetric with respect to its vertical center line.

6. An apparatus for following a vehicle according to claim 4, wherein said distance measuring means comprises:

comparison means for comparing the images of the preceding vehicle taken at the two different points with each other so as to obtain a shift distance by which one of the images is moved towards the other to be fully superposed thereon; and calculating means for calculating the distance to the preceding vehicle based on the shift distance thus obtained.

7. A vehicle following apparatus for use with an automotive vehicle comprising:

image generating means for successively sensing and generating images of objects on a road ahead of an automotive vehicle at each of two different points;

distance measuring means for forming an image-following window of a variable size on a screen on which the images of objects taken at the two different points are displayed, and for measuring the distance to a preceding vehicle based on a comparison of the image of the preceding vehicle taken at each of the two different points;

following means for comparing the images in the image-following window at a first predetermined time with those at a second predetermined time which is spaced in a short time span, searching from the images at the second predetermined time for an image of an object which most resembles the image of the preceding vehicle at the first predetermined time, and setting a new window containing therein the image of the preceding vehicle at a location on the screen in which a symmetrical window is obtained, while shifting the window step by step in the vertical and horizontal directions;

window-position determining means for forming a first window of a prescribed size on the screen at the start of vehicle following and for measuring a distance to an object which is located in the center of the first window, said window-position determining means being operable to change, based on the distance thus measured, the size of the first window to a size substantially similar to the contour of the image of the preceding vehicle, and then search for a horizontally symmetrical image from those picked up by said image sensing means at the one point, said window-position determining means being further operable to automatically determine an optimal position of the window in accordance with the most horizontally symmetrical image provided.

* * * * *